(12) United States Patent (10) Patent No.: US 8,201,893 B1
Sollami (45) Date of Patent: Jun. 19, 2012

(54) QUICK-CHANGE TOOL HOLDER WITH TRANSVERSE HOLE

(75) Inventor: Phillip A. Sollami, Herrin, IL (US)

(73) Assignee: The Sollami Company, Herrin, IL (US)

( * ) Notice: Subject to any disclaimer, the term of this patent is extended or adjusted under 35 U.S.C. 154(b) by 251 days.

(21) Appl. No.: 12/576,409

(22) Filed: Oct. 9, 2009

Related U.S. Application Data (63) Continuation-in-part of application No. 11/998,676, filed on Nov. 30, 2007, now abandoned.

(51) Int. Cl.
*E21C 35/18* (2006.01)
(52) U.S. Cl. .......................................... 299/102; 299/104
(58) Field of Classification Search .................. 299/79.1, 299/81.1–81.3, 100–111, 112 R, 112 T, 113
See application file for complete search history.

(56) References Cited

U.S. PATENT DOCUMENTS
4,337,980 A * 7/1982 Krekeler ........................ 299/102
* cited by examiner

*Primary Examiner* — Sunil Singh
(74) *Attorney, Agent, or Firm* — Robert L. Marsh

(57) ABSTRACT

A quick-change tool holder has an enlarged forward end, a rearwardly extending shank, and an axial bore extending through the enlarged forward end and the shank with the bore having a diameter sized to receive the shank of a cutting tool. A second blind hole extends into the side surface of the enlarged forward end. An extraction device, such as the shank of a worn tool, is inserted into the blind hole. Where the extraction device is a worn tool, the cutting end of the tool is hit with a hammer to remove the tool from a base block mounting.

8 Claims, 6 Drawing Sheets

QUICK-CHANGE TOOL HOLDER WITH TRANSVERSE HOLE

The present application is a continuation-in-part of my co-pending application filed Nov. 30, 2007 and assigned Ser. No. 11/998,676, now abandoned. The present application relates to quick-change tool holders for receiving rotatable tools, and in particular to a transverse hole in the outer wall of a tool holder for receiving an extraction device for extracting a worn tool holder from a base block mounting.

BACKGROUND OF THE INVENTION

Machines used to cut hard surfaces such as concrete and asphalt paving and so forth employ rotatable tools mounted around the circumference of a drum with each of the tools having a tapered forward cutting end behind which is an axially extending shank that is rotatably fitted into a tool holder on the drum. Since the tools of the machine cut very hard materials, the tools must rotate to wear evenly around their circumference and thereby maximize their useful life. Nonetheless, the tools wear rapidly and where the machine is in constant use it is common to replace tools at least daily.

Over time, the tool holders that retain the rotatable tools to the drum must also be changed. The replacement of the tool holders on the surface of a rotatable drum can consume a great deal of time. It has therefore become common for the tool holders to include a base block mounting built on to the surface of the drum with the base block mounting having an axial bore into which a removable quick-change tool holder is fitted. It is the quick-change tool holder that actually holds the tool. The removable quick-change tool holder has an enlarged tapered forward end and a generally planar transverse forward surface at the forward end. Extending axially rearwardly of the enlarged forward end is a shank that is received in the complementarily shaped axial bore of the base block mounting on the machine. Ideally, the quick-change tool holders are easily removed from the base block mountings however, the strong forces applied by the base block mounting and the tool holder to the tools as the machine cuts hard surfaces cause the various parts to become deformed over time. The shank of a quick-change tool holder often becomes tightly lodged within the bore of the base block mounting such that its extraction is difficult.

Presently, it is the practice to apply one end of an elongate punch against the rear end of the shank of a worn tool holder and pound the punch with a hammer to drive the shank of the worn tool holder out of the base block mounting. This process, however, requires that the operator use both hands to extract the tool holder. Frequently, the rotatable drum is positioned at an orientation where it is difficult for the operator to reach both hands behind the base block mounting to position the punch and hammer to remove the worn tool holder and therefore an operator must frequently reposition the orientation of the drum in order to remove the worn tool holders. Also, because of the structure of the machines some tool holders are almost inaccessible to an operator and are very difficult to remove using a hammer and punch.

The process of removing worn tool holders can consume a great amount of time, and the down time for the machine adds to the cost of operating the machine. It would therefore be desirable to provide a simplified method of removing a worn quick-change tool holder from a base block mounting.

SUMMARY OF THE INVENTION

Briefly, the present invention is embodied in a tool holder for retaining a tool where the tool has a cylindrical shank that is removably received in the bore of the tool holder, and the tool holder itself is removably received in a generally cylindrical bore of a base block mounting on a machine. The tool holder of the invention has a body that is generally symmetrical about a longitudinal axis and includes an enlarged forward end having a transverse forward surface and extending rearwardly of the enlarged forward end is a cylindrical shank sized to fit within the bore of the base block mounting. The tool holder body further has an axial bore that extends from the forward surface through the enlarged forward end and through the shank with the diameter of the axial bore sized to receive the shank of a tool in the forward end thereof.

In accordance with the invention, the enlarged forward end of the tool holder has a second cylindrical hole that extends into the outer surface of the enlarged forward end. The axis of the second hole may be generally perpendicular to and intersecting with the longitudinal axis of the axial bore, but the second hole is a blind hole that does not open into the axial hole. The second cylindrical hole has a diameter that is also sized to receive the shank of one of the removable tools of the type received in the axial bore.

In one embodiment, the tool holder further has a plug that is removably received in the transverse hole for preventing debris from entering the blind hole. The removable plug may be received on an annular shoulder formed by a counterbore that extends around the transverse hole and opens in the outer surface of the enlarged forward end. A tool is applied against the outer surface of the plug to flatten the plug and enlarge the circumference to lodge the plug in the counterbore.

In one embodiment of the invention, a notch is provided in the wall of the cylindrical hole and the counterbore with the notch extending from the outer surface to a position radially inward of the lower surface of the counterbore. The notch provides a groove in the wall along an outer edge of the plug for receiving a pointed tool for removing the plug from the counterbore.

In addition to deforming the outer circumference of the plug, portions of the rim surrounding the counterbore may be deformed and bent over the outer circumference of the plug to more strongly retain it. A tool suitable for deforming the rim of the counterbore has a generally circular lower end and a plurality of protrusions extending radially outward from the generally circular central lower end. The lower end is positioned with the central portion over the plug and the protrusions against portions of the rim. The opposite end of the tool is then struck with a hammer to deform the rim and bend it around the plug.

To extract a worn tool holder having a transverse hole closed with a plug, a punch or the like having a generally pointed tip is used to extract the plug that seals the transverse blind hole. It may be necessary to strike the opposite end of the punch with a hammer to dislodge the plug. Once the plug is dislodged, the shank of a tool of the type normally retained in the axial bore of the tool holder is inserted into the bore such that the enlarged cutting end of the tool extends radially outward of the outer surface of the tool holder. A hammer or mallet is then used to strike the cutting end portion of the projecting tool to remove the tool holder from the base block mounting. It is preferable that a worn tool be used for this purpose because a new tool may become damaged during the extraction process. If for some reason a worn tool is not available, a drive pin of the type used to insert a tool holder into a base block mounting has a shank the outer diameter of which is sized to fit within the bore of the tool holder and can also fit into the transverse hole. One advantage of the present invention over prior art extraction devices is that an operator can remove a worn tool holder using only one hand.

BRIEF DESCRIPTION OF THE DRAWINGS

A better understanding of the invention will be had after a reading of the following detailed description taken in conjunction with the drawings in which.

DETAILED DESCRIPTION OF A PREFERRED EMBODIMENT

Figure 1:
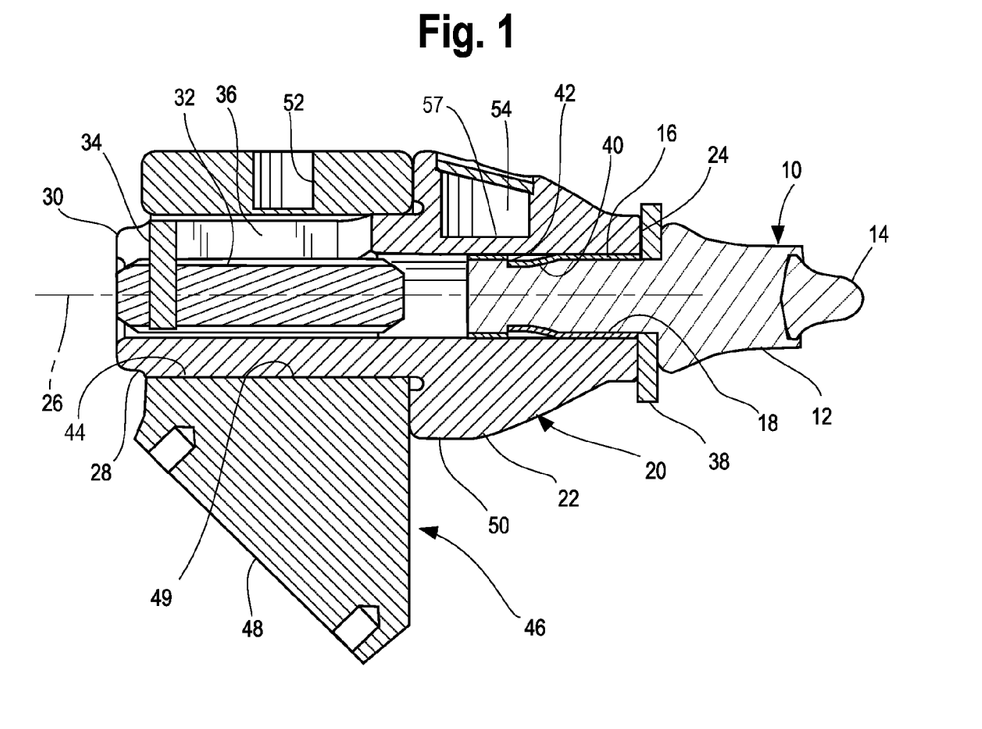
FIG. 1 is a cross-sectional view of a base block mounting having a tool holder in accordance with the present invention therein and a tool received in the tool holder.
Figure 2:
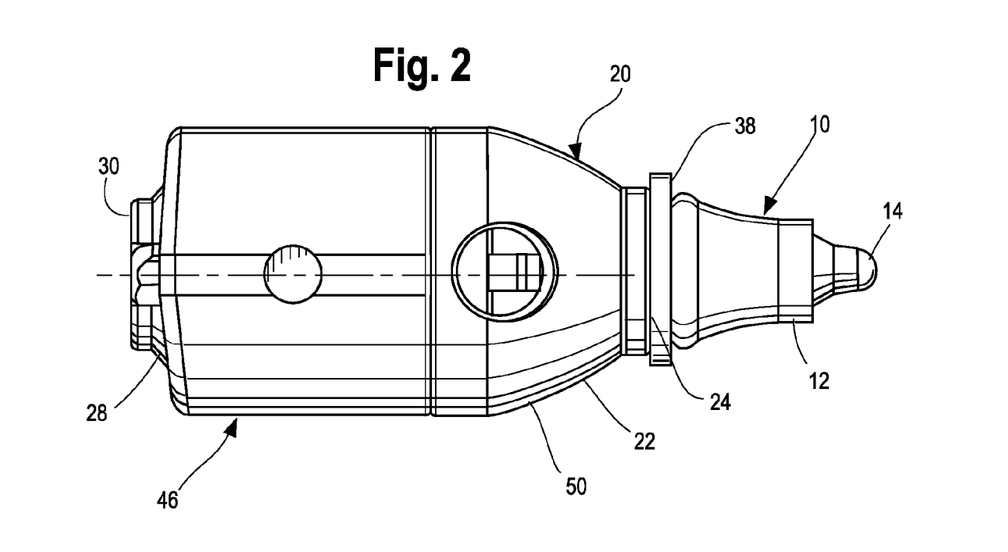
FIG. 2 is a side view of the base block mounting, tool holder, and tool shown in FIG. 1 taken at ninety degrees from that shown in FIG. 1.
Figure 3:
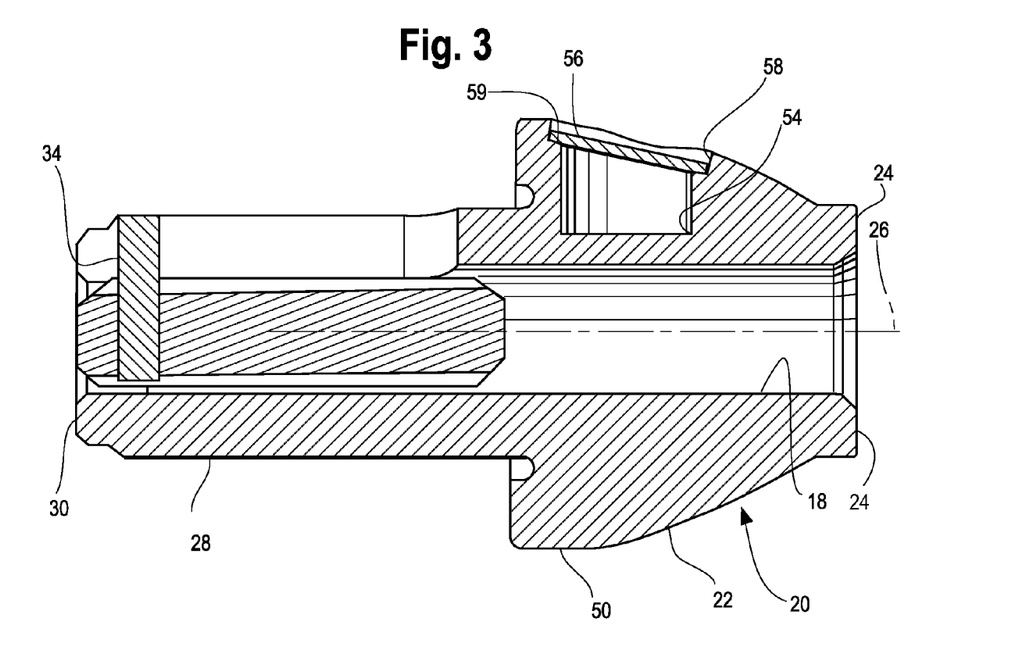
FIG. 3 is an enlarged cross-sectional view of the tool holder shown in FIG. 1.

Referring to FIGS. 1, 2 and 3, a machine used for cutting hard surfaces has a rotating drum, not shown, and mounted around the circumference of the drum are a plurality of rotatable tools one of which bearing indicia number 10 is depicted. Each of the tools 10 has an elongate axially symmetrical body having a cutting portion 12 at the forward end of which is a hardened cutting tip 14 and extending axially rearward of the cutting portion 12 is a generally cylindrical shank 16.

The generally cylindrical shank 16 is received within a cylindrical axial bore 18 in a generally axially symmetric tool holder 20 having an enlarged generally tapered forward end 22. The forward end 22 has a planar forward surface 24 that is perpendicular to the axis 26 of the tool holder 20. Extending axially rearward of the enlarged forward end 22 is a generally cylindrical shank 28. The axial bore 18 extends through a central opening in the forward surface 24 in the enlarged forward end 22 and through the central axis of the shank 28 and opens in the transverse distal end 30 thereof. Fitted in the rearward portion of the axial bore 18 is an axially slideable plunger 32 that is retained within the bore by a pair of pins, one of which bearing indicia number 34 limits forward movement within the bore, and a second of which, not shown, limits rearward movement of the plunger 32.

Positioned between the forward surface 24 of the tool holder 20 and a rearwardly facing annular flange of the cutting portion 12 of the tool holder 10 is a wear ring 38 that protects the forward surface 24 from becoming worn away as a result of rotation of the tool 10 in the axial bore 18. The cylindrical shank 16 of the tool 10 is retained within the axial bore 18 by a generally tubular retaining sleeve 40 that engages an annular shoulder 42 on the shank 16 thereby preventing forward movement of the tool 10 and also applies a radially outward pressure against the inner surface of the cylindrical axial bore 18 of the tool holder 20 to retain the tool 10 within the tool holder 20.

The generally cylindrical shank 28 of the tool holder 20 is in turn received within a generally cylindrical bore 44 of a base block mounting 46 having a mounting portion 48 for angularly retaining the base block mounting 46 to the outer surface of the rotatable drum, not shown, of a cutting machine.

During use of the machine, the cutting portion 12 of the tool 10 is forced against a hard surface causing wear to the cutting tip 14 and as a result, the tools 10 must be frequently replaced. After the machine has been used for a long period of time, perhaps half of a working season, the hard particles broken loose by the tools 10 also cause wear to the outer surface 50 of the tool holders 20. Wear can occur rapidly to a tool holder 20 where the tip 14 of the tool 10 has failed causing the body of the tool 10 to be rapidly consumed. When this occurs the tool holders 20 must also be replaced.

In order to cut hard material the machine applies great force from the drum through the base block mounting 46 and the tool holder 20 to the tool 10 and over time the forces applied by the machine cause the various parts to become deformed. It is quite common for the shank 28 of the tool holder 20 to become tightly wedged within the generally cylindrical bore 44 of the base block mounting 46 such that it is difficult to extract the tool holder 20 from the base block mounting 46.

One method of extracting the tool holder 20 is to apply one end of an elongate punch or another type of tool against the distal end 30 of the generally cylindrical shank 28 and pound the tool with a hammer thereby forcing the shank 28 forwardly through the bore 44 until it is dislodged. Although this method works satisfactorily in many circumstances, some of the base block mountings are positioned on the drum in locations that are not readily accessible to a machine operator making it difficult to use a hammer and punch to remove a worn tool holder 20 from a base block mounting 46. It is therefore desirable to provide alternative methods for removing a worn tool holder 20. In my co-pending application Ser. No. 10/998,432, I have described an extraction device that includes a radially inwardly directed pin that fits into a bore 52 extending into the outer wall of the base block mounting 46 to grasp the base block mounting 46 and apply pressure to the tool holder 20 to cause the shank 28 to break loose from its position within the bore 44. The use of the device disclosed in my co-pending application, however, requires the attachment of several parts around the assembled base block mounting 46 and tool holder 20.

Figures 7, 8:
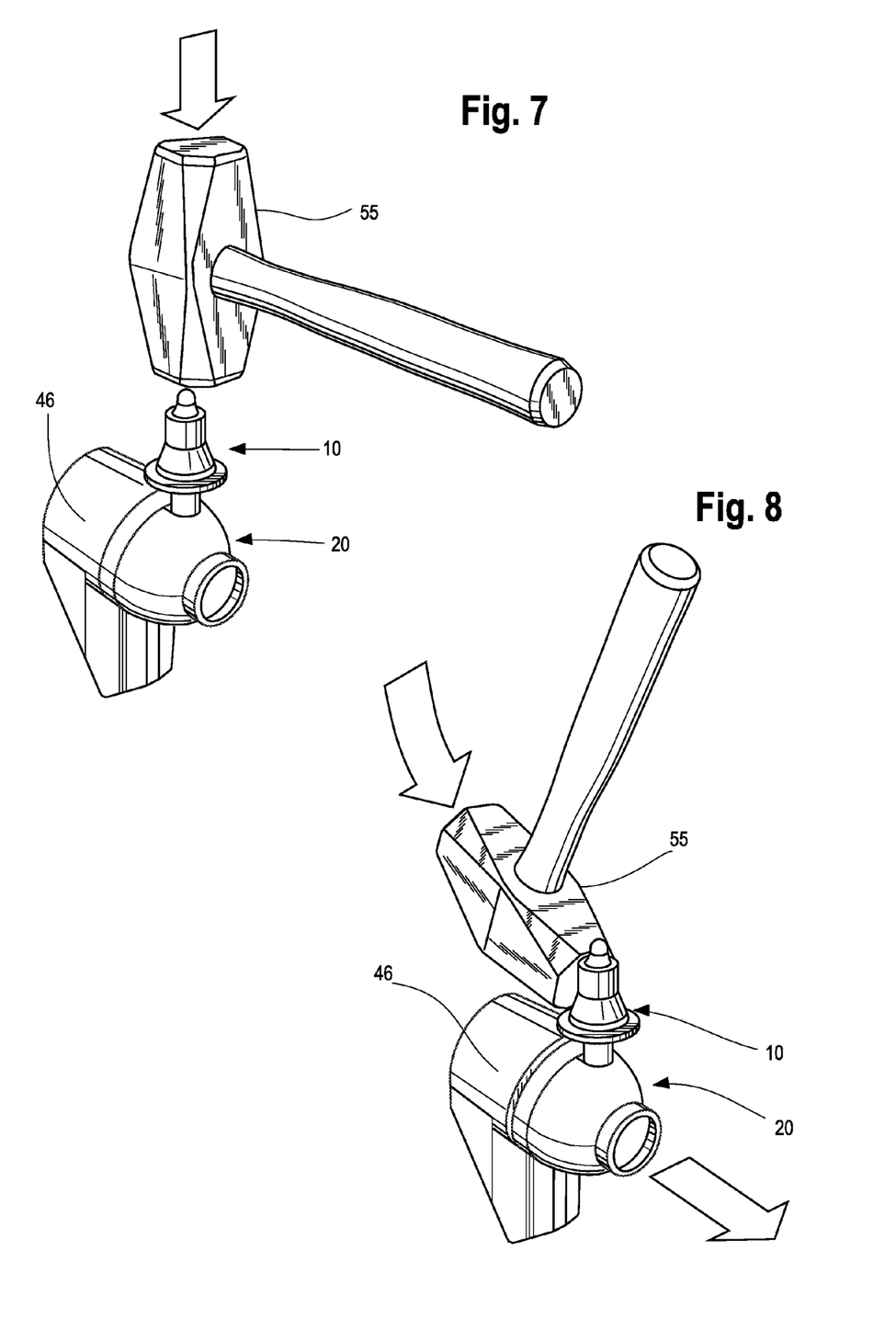
FIG. 7 is an isometric view of the tool holder in accordance with the invention while the shank of a tool is being pounded into the transverse hole thereof.
FIG. 8 is an isometric view of the tool holder shown in FIG. 7 being removed from the base block mounting.

Referring to FIGS. 3, 4, 7, and 8 in accordance with the present invention, an alternate method of providing removal of a tool holder 20 from a base block mounting 46 requires a cylindrical blind hole 54 that extends into the outer surface 50 of the enlarged forward end 22 of the tool holder 20 with the axis of the hole 54 being generally perpendicular to and intersecting the longitudinal axis 26. The blind cylindrical hole 54 has a diameter that is equal to or a little greater than the axial bore 18 so as to receive the shank 16 of a typical tool 10 used by the machine. It should be appreciated that while the tool holders 20 are infrequently replaced, perhaps twice each working season, the tools 10 are replaced on a regular basis, perhaps more than once during each work day. As a result, a machine operator will have access to many worn tools that have fallen to the ground after removal or have been collected in boxes. The operator can readily obtain one of the worn tools and use a hammer 55 to pound the shank 16 of the worn tool 10 into the blind cylindrical hole 54 such that the cutting portion 12 of a worn tool 10 extends radially outward of the outer surface 50 of the tool holder 20. Thereafter, the hammer 55 is pounded against the outer surface of the cutting portion 12 of the worn tool 10, as shown in FIG. 8, to remove the shank 28 of the tool holder 20 from the bore 44 of the base block mounting 46.

It is important that the hole 54 be a blind hole, that is, that the hole 54 does not open into the axial bore 18 of the tool holder 20. A continuous barrier wall 57 therefore separates the opening of hole 54 from the axial bore 18. As a result of the extended testing of various alternate configurations of the invention, I have found that if the second hole 54 opens into the axial bore 18, the structural integrity of the tool holder 20 is weakened. The metal wall forming the axial bore 18 will more easily deform, enlarging the diameter of the bore 18 and thereby shortening the useful life of the tool holder 20.

Figure 4:
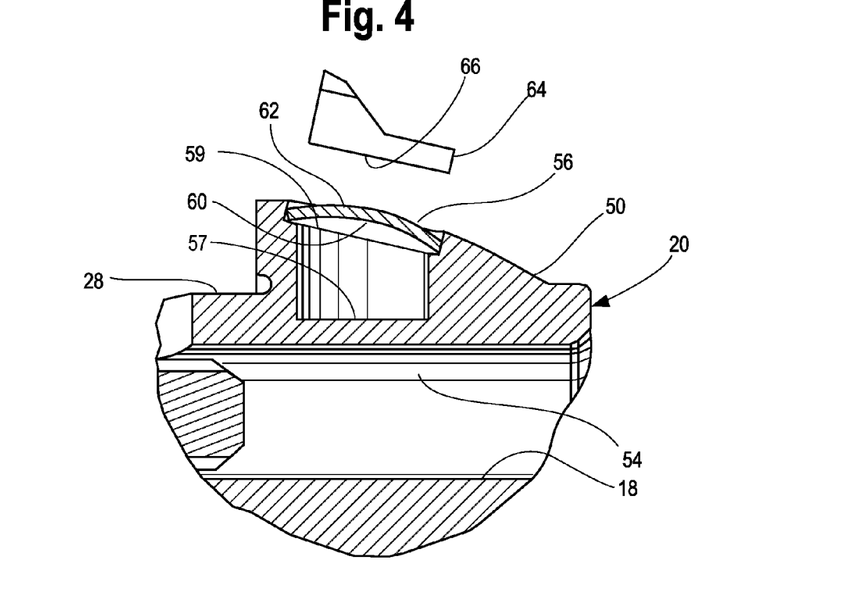
FIG. 4 is an enlarged fragmentary cross-sectional view of the tool holder shown in FIG. 3 showing a plug fitted therein prior to being compressed by a compression tool.

Referring further to FIGS. 3 and 4, to prevent debris from entering into the blind cylindrical hole 54, a disc shaped metal plug 56 is inserted across the blind hole 54 near the outer surface 50 of the tool holder 20. To receive the metal plug 56, a cylindrical counterbore 58 is provided around the mouth of the blind hole 54 adjacent the outer surface 50 with the counterbore 58 having a diameter a little larger than the diameter of the blind hole 54 so as to form an annular shoulder 59 that is recessed a short distance from the outer surface 50. It should be appreciated that although the axis of the blind hole 54 may be generally perpendicular to the axial bore 44, the counterbore 58 is preferably angled with respect to the axis of the blind hole 54 so that the outer surface of the plug 56 will conform as nearly as possible to the adjacent portions of the outer surface 50 of the tool holder 20. The outer circumference of the disc shaped plug 56 rests against the annular shoulder 59.

As best shown in FIG. 4 the plug 56 is manufactured with concave and convex surfaces 60, 62 respectively opposite each other such that the surfaces of the plug 56 are partially spherical. The outer circumference of the plug 56 is made a little smaller than the inner circumference of the counterbore 58 but larger that the inner circumference of the blind hole 54 such that the outer edge of the plug 56 will rest upon the shoulder 59 formed by the counterbore 58. Thereafter, a tool 64 having a circular substantially planar end surface 66 with a diameter approximately equal to the diameter of the metal plug 56 is pounded against the radially outwardly bowed outer surface 62 of the plug 56. The plug 56 is thereby deformed causing the cylindrical outer surface thereof to be compressed against the cylindrical inner surface of the counterbore 58 as shown in FIG. 3, thereby locking the plug in place. Preferably, the plug 56 has a thickness of about 0.080 inches and is carburized about 0.020 inches deep and hardened to a hardness of between Rc 55 and Rc 67 on the Rockwell "C" scale of hardness. The outer circumference of the plug 56 will then be harder than the metal forming the wall of the counterbore. When a hardened plug 56 is subsequently deformed by tool 64 the lower circumference of the plug 56 will be more radially extended and will bite into the wall of the counterbore 58 to retain the plug 56.

Figure 11:
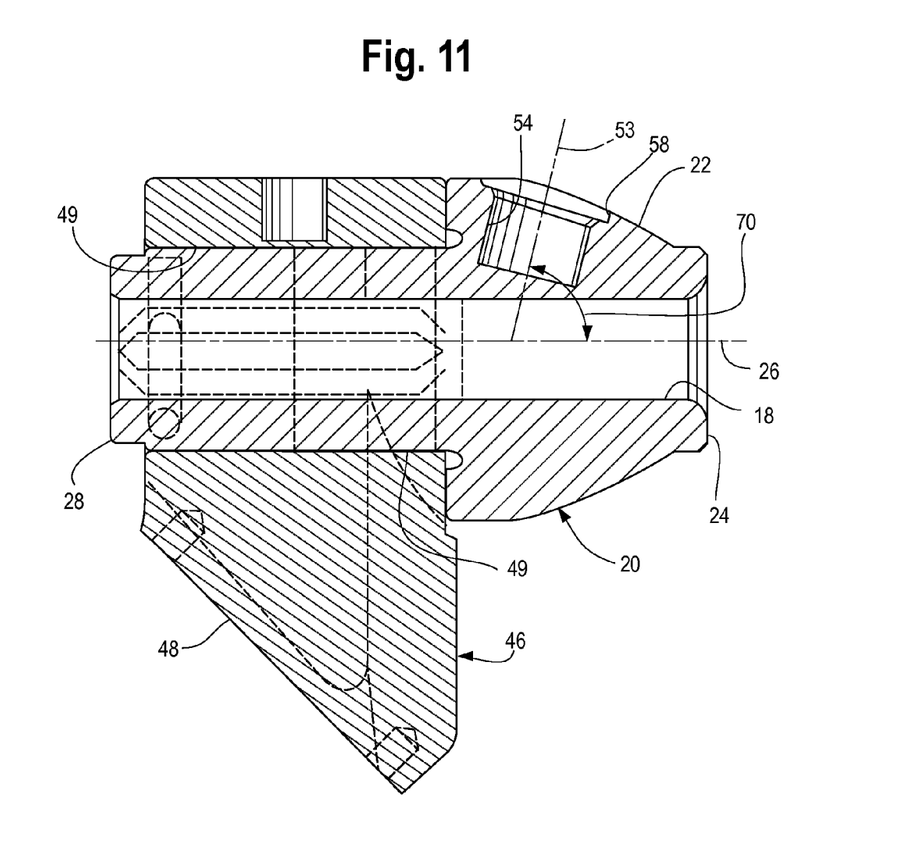
FIG. 11 is a cross-sectional view of another tool in which the second hole is not perpendicular to the bore.

Referring to FIG. 11, it is sometimes desirable that the blind hole 54 have a longitudinal axis 53 that is not perpendicular to the longitudinal axis 26 of the axial bore 18, but at an angle 70 that is less than ninety degrees in order that the axis 53 of the blind hole be generally perpendicular to the outer surface 22 of the tool holder 20. The angle 70 is then determined in part by the surface 22 of the tool holder. I have found that the invention works well with the axis 53 at an angle 70 of seventy-eight degrees.

Figure 5:
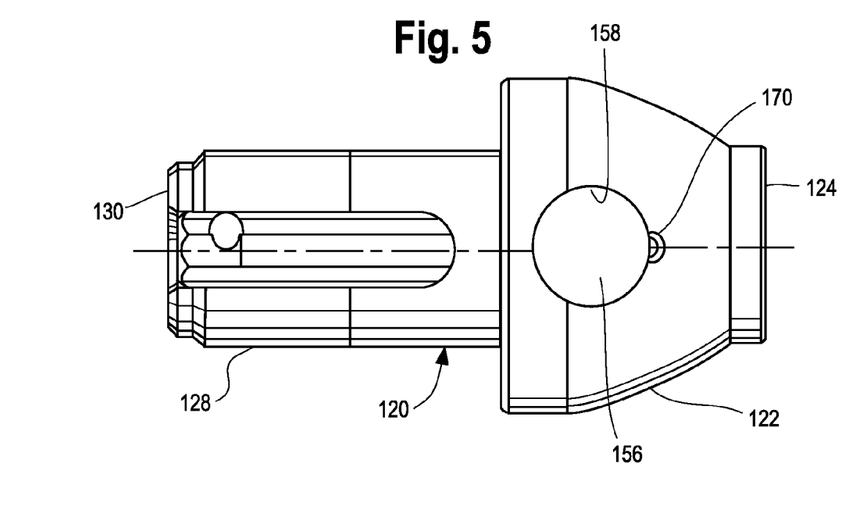
FIG. 5 is a side elevational view of another tool holder in accordance with a second embodiment of the invention.
Figure 6:
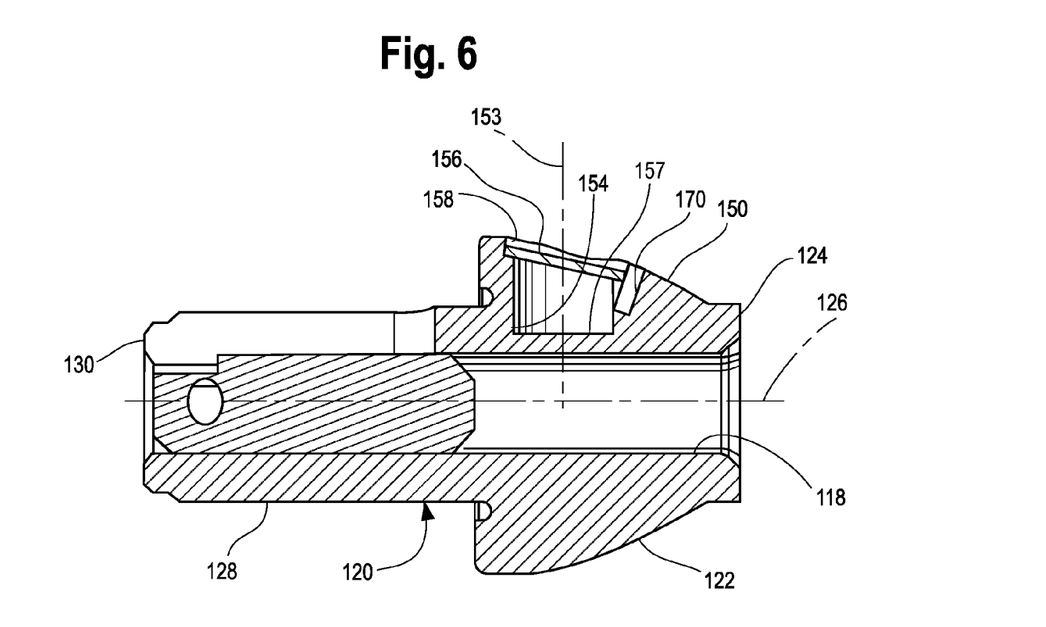
FIG. 6 is a cross-sectional view of the tool shown in FIG. 5 with the tool holder rotated ninety degrees about its longitudinal axis.

Referring to FIGS. 5 and 6, a second embodiment of a tool holder 120 has an enlarged forward end 122, a rearwardly directed generally cylindrical shank 128 and an axial bore 118 extending from a forward surface 124 to a planar rearward end 130. In this embodiment, a blind hole 154 has a longitudinal axis 153 that intersects the longitudinal axis 126 of the tool holder 120, but the opening of hole 154 is separated from the axial bore 118 by a barrier 157. Near the outer surface 150 of the tool holder 120 and surrounding the blind hole 154 is a cylindrical counterbore 158 into which a plug 156 is fitted. The described parts are all similar to that described above with respect to tool holder 20.

In this embodiment, however, extending along one wall of the blind hole 154 and parallel to the axis of the counterbore 158 is an elongate notch 170 that extends into the wall of the counterbore 158 and the wall of the blind hole 154. When the plug 156 is inserted into the counterbore 158 and locked into place with a tool, such as tool 64 previously described, the outer surface of the plug 156 will not entirely fill the notch 170, however, any remaining opening will be small and will be easily filled with debris once the machine is placed in use.

Figure 9:
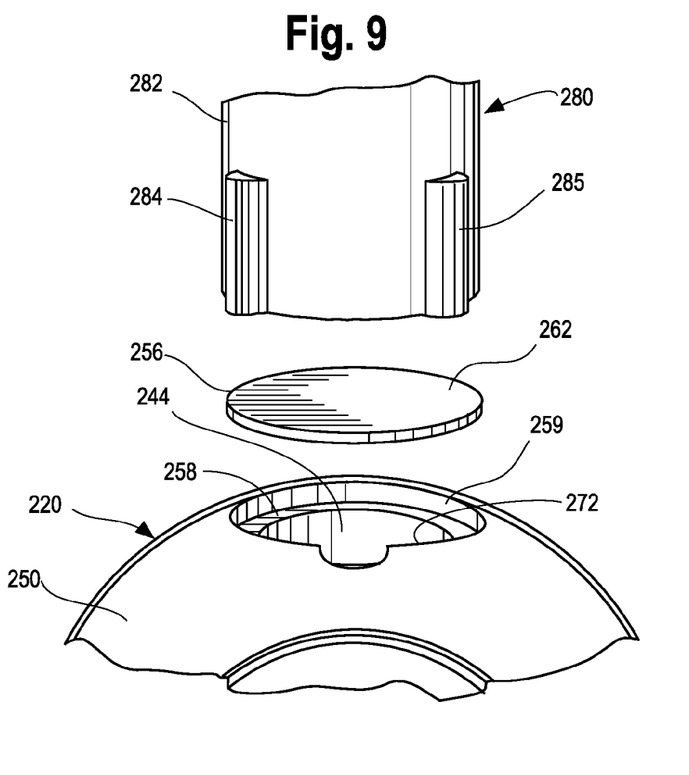
FIG. 9 is a fragmentary front elevational view of a tool holder having a plug ready to be sealed into a transverse hole in accordance with another embodiment of the invention.
Figure 10:
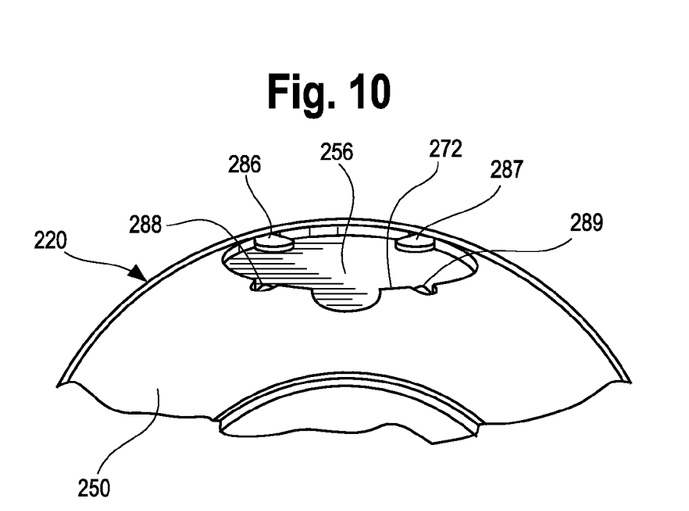
FIG. 10 is a another fragmentary enlarged front elevational view of the parts shown in FIG. 9 after the plug is flattened and sealed in place.

Referring to FIGS. 9 and 10, instead of using a tool 64 to deform the outer circumference of the plug 56, the plug 256 can be retained against the annular surface 259 of a counterbore 258 around a transverse cylindrical bore 244 by deforming the rim 272 of the counterbore 258 and causing portions of the metal of the tool holder 20 to fold over the outer surface 262 of the plug 256. To deform the rim 272 a tool 280 having a generally cylindrical body 282 with a diameter approximately equal to that of the plug 256 is provided. The tool 280 has a plurality of parallel ribs extending along the outer surface of the body 282, two of which bearing indicia numbers 284, 285 are visible. The lower end of ribs 284, 285 extend at least to the lower end of the tool body 282. To lock the plug 256 in the counterbore 258 the lower end of the ribs 284, 285 are positioned against the surface 250 of the tool holder 220 forming the rim 272. The opposite end of the tool body 282 is then struck with a hammer, not shown, causing the ribs 284, 285 to deform portions 286, 287, 288, 289 of the rim 272 to lock the plug 256 in place.

While the present invention has been described with respect to several embodiments, it will be appreciated that many modifications and variations may be made without departing from the spirit and scope of the invention. It is therefore the intent of the following claims to cover all such variations and modifications that fall within the true spirit and scope of the invention.

What is claimed:

1. A tool holder for retaining a tool having a cylindrical shank with a given diameter wherein said tool holder is removably received in a bore of a base block mounting, said tool holder comprising a body having a longitudinal axis, said body having an enlarged forward end with a transverse forward surface, and a side surface, said body also having an axially rearwardly extending shank sized to fit within said base block mounting bore, said body further having an axial bore extending into said forward surface and through said enlarged forward end and said shank, said axial bore sized to receive said shank of said tool, said enlarged forward end having a cylindrical hole generally perpendicular to said axis and said cylindrical hole having a diameter also sized to receive said shank of said tool, said cylindrical hole being a blind hole, said cylindrical hole opening into said side surface, and said enlarged forward end having a counterbore around said opening of said cylindrical hole in said side surface.

2. The tool holder of claim 1 and further comprising a removable plug in said cylindrical hole, said removable plug having an outer perimeter that rests against said counterbore.

3. The tool holder of claim 2 wherein said enlarged forward end is made of metal having a hardness and said plug is made of metal having a hardness greater than said hardness of said enlarged forward end.

4. The tool holder of claim 3 wherein said plug is carburized and hardened to between Rc 55 and Rc 67.

5. The combination comprising a base block mounting having a bore, a tool holder having an enlarged forward end and a rearwardly extending shank fitted into said bore of said base block mounting, said tool holder also having an axial bore extending through said enlarged forward end and said rearwardly extending shank, said axial bore having a diameter sized to receive a shank of a tool, said enlarged forward end having a side surface, said enlarged forward end further having a cylindrical hole having an axis generally perpendicular to said axial bore, said cylindrical hole opening into said side surface, said cylindrical hole being a blind hole having a diameter at least equal to a diameter of said axial bore and said enlarged forward end having a counterbore around said opening of said cylindrical hole in said side surface.

6. The combination of claim 5 and further comprising a removable plug in said cylindrical hole, said removable plug having an outer perimeter that contacts said counterbore.

7. The combination of claim 6 wherein said enlarged forward end is made of metal having a hardness and said plug is made of metal having a hardness greater than said hardness of said enlarged forward end.

8. The combination of claim 7 wherein said plug is carburized and hardened to between Rc 55 and Rc 67.

* * * * *